US012749091B1

(12) United States Patent
Scheibelhut et al.

(10) Patent No.: US 12,749,091 B1
(45) Date of Patent: Sep. 29, 2026

(54) ARTIFICIAL INTELLIGENCE AGENT FOR PERSONALIZED COMMUNICATION WITH USERS OF AN ONLINE SYSTEM

(71) Applicant: Maplebear Inc., San Francisco, CA (US)

(72) Inventors: Brent Scheibelhut, Toronto (CA); Mark Oberemk, Toronto (CA); Naval Shah, Toronto (CA); Charles Wesley, San Diego, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 19/089,989

(22) Filed: Mar. 25, 2025

(51) Int. Cl.

| | |
|---|---|
| ***G06Q 30/0251*** | (2023.01) |
| ***G06Q 30/0241*** | (2023.01) |
| ***G06Q 30/0273*** | (2023.01) |
| ***G06Q 30/0601*** | (2023.01) |

(52) U.S. Cl.
CPC ..... *G06Q 30/0253* (2013.01); *G06Q 30/0254* (2013.01); *G06Q 30/0275* (2013.01); *G06Q 30/0276* (2013.01); *G06Q 30/0633* (2013.01); *G06Q 30/0641* (2013.01)

(58) Field of Classification Search
CPC ........... G06Q 30/0253; G06Q 30/0254; G06Q 30/0275; G06Q 30/0276; G06Q 30/0633; G06Q 30/0641
USPC ................................................ 705/14.51, 40
See application file for complete search history.

(56) References Cited

U.S. PATENT DOCUMENTS 12,190,283 B2 * 1/2025 Luan ................ G06Q 10/08355
2010/0082421 A1 * 4/2010 Tuladhar ............ G06Q 30/0242 705/40
2017/0337509 A1 * 11/2017 Veras-Nunez ....... G06Q 10/087
2018/0300028 A1 * 10/2018 Vora ........................ G06F 9/451
2019/0042185 A1 * 2/2019 Young ..................... G06F 3/167
2019/0172089 A1 * 6/2019 Tang .................. G06Q 30/0242
2020/0042610 A1 * 2/2020 Boles ................ G06F 16/24578
2024/0346309 A1 * 10/2024 Majumdar ............... G06N 3/09
2024/0386348 A1 * 11/2024 Reichl .............. G06Q 10/06316
2025/0005263 A1 * 1/2025 Mansour ............... G06F 40/134
2025/0111162 A1 * 4/2025 Hu .......................... G06F 40/35
2025/0200592 A1 * 6/2025 Kwittken ........... G06Q 30/0276

(Continued)

OTHER PUBLICATIONS

Insightoftware, Top 5 Predictive Analytics Models and Algorithms, 2024 (Year: 2024).*

*Primary Examiner* — Tarek Elchanti
(74) *Attorney, Agent, or Firm* — Fenwick & West LLP

(57) ABSTRACT

An online system integrates an artificial intelligence (AI) agent to communicate with users. Upon obtaining a set of candidate items (e.g., promotional items), the online system applies a machine-learning model to generate a score for each candidate item that is indicative of a likelihood of a user converting on each candidate item. Based on the scores, the online system selects an item from the candidate items for user's recommendation. The online system prompts the AI agent with information about the item, user's features, content of a current order, and inputs from an online platform (e.g., bid for the item) to generate a pitch for the item. The online system then generates a user interface signal causing a user's device to display a user interface with a description of the item, provide the pitch for the item, and display a user interface element for adding the item to the current order.

19 Claims, 4 Drawing Sheets

(56) References Cited

U.S. PATENT DOCUMENTS

2025/0220084 A1* 7/2025 Kuppusamykrishnan .................. G06T 11/00
2025/0245548 A1* 7/2025 Haramaty-Krasne ........................ G06N 20/00
2025/0321991 A1* 10/2025 Gardner ................ G06F 40/253

* cited by examiner

ARTIFICIAL INTELLIGENCE AGENT FOR PERSONALIZED COMMUNICATION WITH USERS OF AN ONLINE SYSTEM

BACKGROUND

An online system allows its users to interact with items, e.g., by placing online orders for the items. The online system utilizes an item replacement language model and an artificial intelligence (AI) shopping agent to facilitate picking items for users. It would be desirable to incorporate recommendations of items provided by third-party entities (e.g., brand owners, retailers, consumer packaged goods entities, etc.) into the online system that utilizes the replacement language model and the AI shopping agent. However, there is a technical problem of configuring the replacement language model and the AI shopping agent to provide personalized suggestions to users of the online system about the items that are provided by third-party entities.

SUMMARY

Embodiments of the present disclosure are directed to an online system that integrates an artificial intelligence (AI) agent (e.g., generative model, or language model) with a trained machine-learning model to allow for personalized communication with users of the online system, such as personalized recommendation of items for inclusion into online orders.

In accordance with one or more aspects of the disclosure, the online system receives, via a network and from an online platform, information about a set of candidate items. The online system accesses a conversion prediction machine-learning model of the online system, wherein the conversion prediction machine-learning model is trained to predict a likelihood of a user of the online system converting on each candidate item from the set of candidate items. The online system. The online system applies the conversion prediction machine-learning model to information about the user and information about each candidate item from the set of candidate items to generate a score that is indicative of the likelihood of the user converting on each candidate item from the set of candidate items. The online system selects, using the score for each candidate item, an item from the set of candidate items. The online system generates a prompt for input into a generative model, the prompt including information about the item, one or more features of the user, content of a current order placed by the user, and one or more inputs from the online platform. The online system requests the generative model to generate, based on the prompt input into the generative model, an output including a pitch for the item. The online system generates, using the output, a user interface signal. The online system sends, via the network, the user interface signal to a device associated with the user, wherein the sending the user interface signal causes the device associated with the user to display a user interface with a description of the item, provide the pitch for the item, and display a user interface element for use by the user to add the item to the current order.

DETAILED DESCRIPTION

Figure 1:
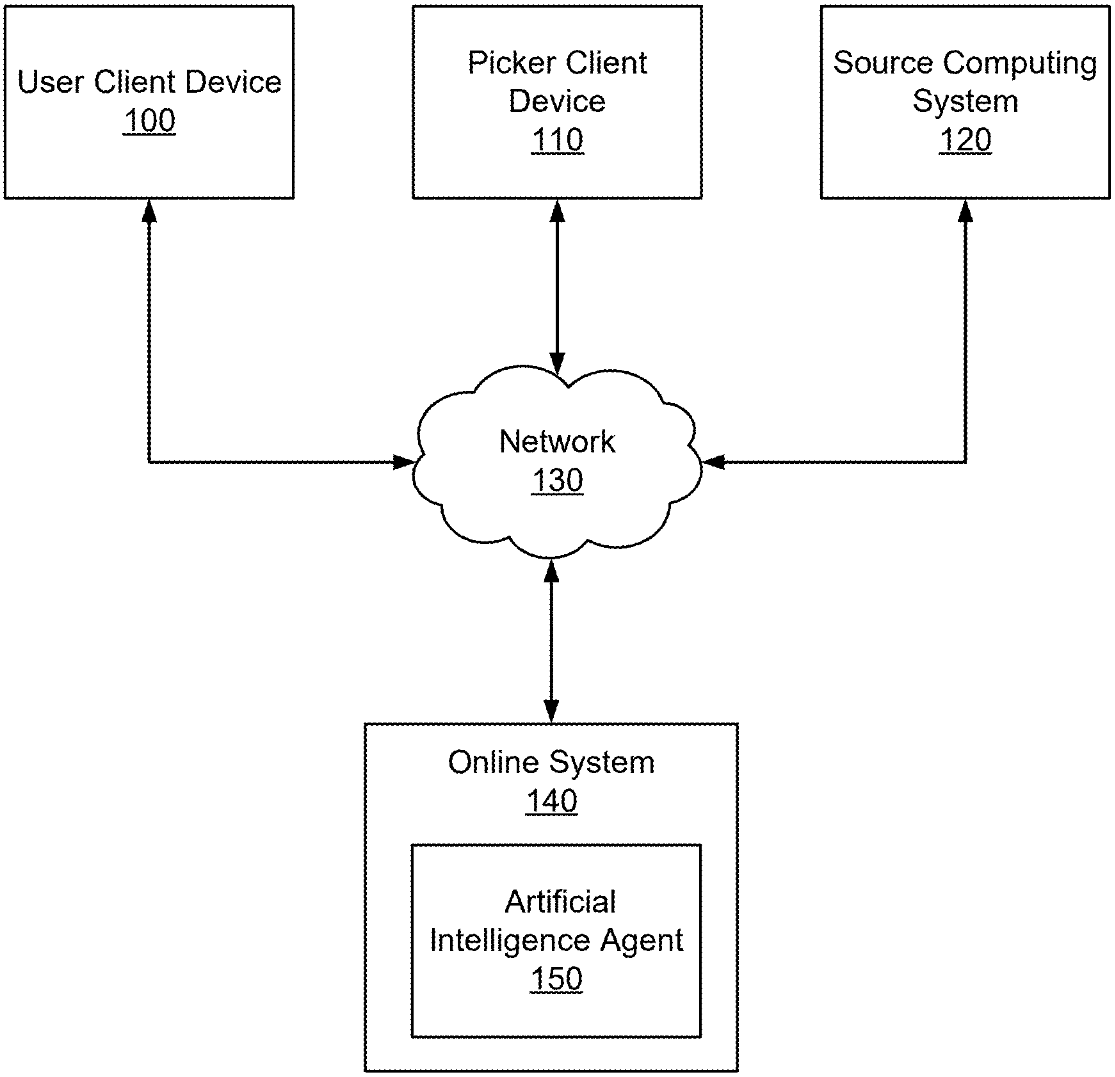
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140 that includes an artificial intelligence agent 150. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker (i.e., fulfillment agent, servicing agent, or agent) that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system 140 and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a source location. The user's order may specify which groceries they want to be delivered from the source location and the quantities of each of the groceries. The user client device 100 transmits the user's order to the online system 140 and the online system 140 selects a picker to travel to the source location to collect the groceries ordered by the user. The online system transmits an offer to the picker for the picker to service the order in exchange for consideration and, if the picker accepts the offer, the picker collects the groceries from the source location. Once the picker has collected the groceries ordered by the user, the picker delivers the groceries to a location transmitted to the picker client device 110 by the online system 140.

The online system 140 uses an artificial intelligence (AI) agent 150 to communicate with a user of the online system 140. In the illustrated embodiments, the AI agent 150 is part of the online system 140. In one or more other embodiments, the AI agent 150 may be implemented as part of operations of the user client device 100. In one or more embodiments, the AI agent 150 comprises a generative model, e.g., language model or large language model (LLM). The online system 140 may train or tune the AI agent 150 with information about the online system 140 (e.g., a catalog or database of items served by the online system 140) or a set of objectives important to an operator of the online system 140. In the case where the AI agent 150 comprises a generative model, the online system 140 may tune the parameters of the generative model with the business information and the objectives. To personalize the AI agent 150 for a user or a cohort of users, the online system 140 may further tune the AI agent 150 with information about the user or users, such as preferences, information about previous engagement with the online system 140, or any other information about the users tracked by the online system 140. The online system 140 may use prompt tuning where the "training" information is in the body of a prompt input into the AI agent 150, which tunes a generative model instance of the AI agent 150. Alternatively, the online system 140 may train the parameters to create multiple AI agents 150.

To start using the AI agent 150, the online system 140 may instantiate the AI agent 150 with inputs (e.g., a set of objectives, user data, item data, online catalog, etc.). In one or more embodiments, in response to an order session being started between the user device 100 and the online system 140, the online system 140 instantiates the AI agent 150. Moreover, while the user interacts with the online system 140 during a particular session, the online system 140 may further tune the AI agent 150 with contextual information about the session so that the AI agent 150 can provide better responses based on the user's current experience.

The online system 140 may use the AI agent 150 to communicate with and provide service to users, e.g., to build orders or discuss replacements for unavailable items in an order. The online system 140 may deploy a machine-learning model to score each candidate item to be offered to the user via a chat interface of the user client device 100, and an item is selected based on the scores, where each score indicates a likelihood of the user converting on (i.e., ordering) each candidate item. The online system 140 may then prompt the generative model of the AI agent 150 to generate a pitch (e.g., text content associated with the item) for inclusion in the chat interface to suggest to the user to add the item to the order. The AI agent 150 may then send the pitch to the user client device 100 in the chat interface on a display of the user client device 100, from which the user can select the item.

The online system 140 presented herein may integrate the machine-learning model to infer which users should receive a pitch for a particular sponsored item, as well as the generative model to craft a personalized pitch to the user for the sponsored item. In this manner, the online system 140 may allow consumer packaged goods (CPG) entities and other third-party entities (e.g., brand owners, sources, etc.) to incorporate their data into responses from the AI agent 150. The third-party entities may bid for slots as replacement suggestions and queries, or when users are building conversion lists while interacting with the AI agent 150. The online system 140 may also deploy the machine-learning model and the AI agent 150 to prompt users to try new items with special offers. All these solutions may be integrated with a personalization algorithm specific to a given user of the online system 140. The online system 140 is described in further detail below with regards to FIG. 2.

Figure 2:
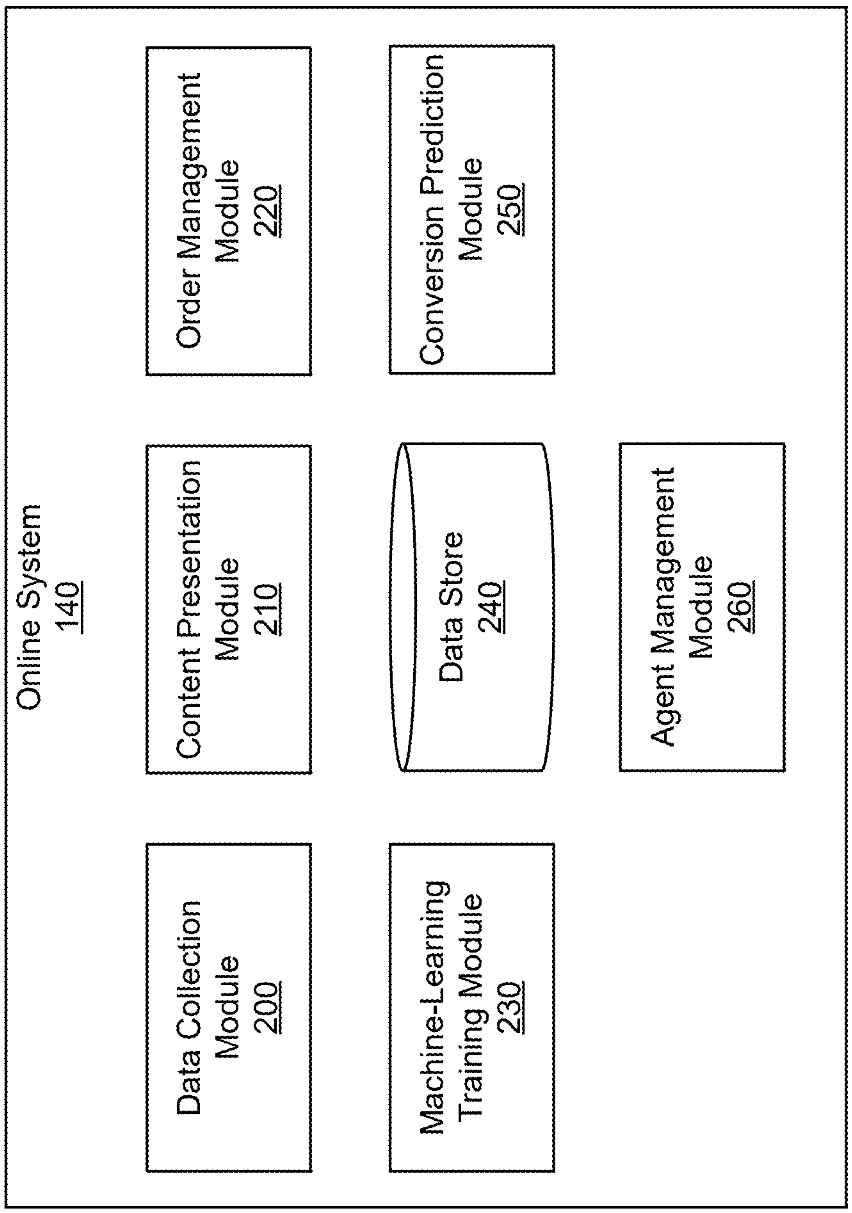
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, a conversion prediction module 250, and an agent management module 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery time frame requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested time frame. Thus, when the order management module 220 receives an order, the order management module 220 may delay offering the order to a picker if the requested time frame is far enough in the future (i.e., the picker may be offered the order at a later time and is still predicted to meet the requested time frame).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system

140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The conversion prediction module 250 may access a conversion prediction model (e.g., machine-learning model) that is trained to predict a likelihood of a user's conversion if an item is suggested to the user. The conversion prediction module 250 may deploy the conversion prediction model to run a machine-learning algorithm to input signals to output a score for a candidate item that is indicative of a likelihood of a user's conversion if the candidate item is suggested to the user. The score may be a value between 0 and 1, where a lower value of the score indicates a lower likelihood of the user's conversion of the candidate item, and a higher value of the score indicates a higher likelihood of the user's conversion of the candidate item. The conversion prediction model may thus be implemented as an engagement prediction model that predicts a likelihood of engagement of a particular user with a specific item. A set of parameters for the conversion prediction model may be stored at one or more non-transitory computer-readable media of the conversion prediction module 250. Alternatively, the set of parameters for the conversion prediction model may be stored at one or more non-transitory computer-readable media of the data store 240.

In providing the input signals to the conversion prediction model, the conversion prediction module 250 may provide features of a given user of the online system 140, features of an item, a bid spent on the item by a third-party entity (e.g., CPG entity, brand owner, etc.), real time contextual data, some other input data, or some combination thereof. The conversion prediction module 250 may apply the machine-learning algorithm to the input signal to infer who, of users in a user catalog database (e.g., part of the data store 240), receives a pitch for a particular item given the bid spent on the item, features for each user, the item's features, or real time contextual data. Based on scores generated for all the users in the user catalog database, the conversion prediction module 250 may select a specific user having the highest likelihood of converting on the item, i.e., the user having the highest score among all users in the user catalog database.

The conversion prediction module 250 may retrieve, from a user catalog database (e.g., part of the data store 240) and using an identifier of the user, information about the user's features including information about the user's preferences (e.g., preferences about types of items, brand preferences, dietary preferences, replacement preferences, etc.), information about the user's order history, information about expiration dates of items previously purchased by the user, some other user related data, or some combination thereof. The conversion prediction module 250 may further retrieve, from an item catalog database (e.g., part of the data store 240) and using an identifier of the item, information about the item's features including information about a type of the item, a taxonomy of the item, a brand of the item, perishability of the item, some other item related data, or some combination thereof. The conversion prediction module 250 may also receive in real time, via the network 130 and from the user client device 100, the contextual data including information about a time of the day, day of the week, current weather, some other real time contextual data, or some combination thereof. Furthermore, the conversion prediction module 250 may receive, from a device associated with the third-party entity (e.g., the source computing system 120) and via the network 130, information about the bid spent on the item by the third-party entity.

The machine-learning training module 230 may perform initial training of the conversion prediction model by using training data including information retrieved from the user catalog database about users' general features. A general feature for a given user of the online system 140 may include information about a general replacement preference related to a preference of the user that applies across multiple types of items. Each label for the training data may include an identifier of a missing item, an identifier of a replacement item selected by a user as a replacement for the missing items, and a set of one or more identifiers associated with one or more general features for the user. The machine-learning training module 230 may train the conversion prediction model using the training data to generate initial values for the set of parameters of the conversion prediction model.

The agent management module 260 may use one or more AI agents (e.g., the AI agent 150) to generate responses that are customized to users based on users' features (e.g., users' preferences). In one or more embodiments, a single AI agent is used for a plurality of different users. In one or more other embodiments, each user is associated with a different AI agent that is tuned for that specific user. In yet one or more other embodiments, the users are segmented into cohorts of users having similar features (e.g., replacement preferences), and each cohort of users is associated with a different AI agent that is tuned for that cohort. In one or more embodiments, some or all of the one or more AI agents are part of the online system 140. In one or more other embodiments, some or all of the one or more AI agents may be on user client devices 100. An AI agent may be a generative model (e.g., language model or LLM) that is tuned to communicate with users on the user client devices 100 in accordance with a set of objectives of the online system 140.

The set of objectives may be goals used by the agent management module 260 to guide behavior and decision making of the AI agent 150. An objective may be, e.g., having at least a threshold level of profit for a transaction, ensuring a threshold level of impressions for items from an item catalog database (e.g., part of the data store 240), ensuring a threshold level of impressions for sponsored items from the item catalog database, maintaining a level of user satisfaction (e.g., selecting items that are requested by the user), assisting sources in turning over inventory, fulfillment costs being less than a threshold value, etc. Each of the objectives may be associated with a weight value, and in one or more embodiments, different objectives may have different weight values. For example, having at least a threshold level of profit for a transaction may have a higher weighting than, e.g., assisting sources in turning over inventory.

The agent management module 260 may instantiate an AI agent (e.g., the AI agent 150) with inputs (e.g., the set of objectives, user data associated with a user, item data, the item catalog database, etc.). In one or more embodiments, the agent management module 260 instantiates the AI agent in response to a user participating in or beginning an order session via the user client device 100 associated with the user.

The agent management module 260 may generate a prompt for input into the AI agent 150 (e.g., generative model). The prompt may include a request for the AI agent 150 to generate an output for a chat interface of the user client device 100, where the output may include textual content or voice content that pitches (i.e., promotes or recommends) the item to the user. The AI agent 150 may generate the output that is optimal for the user that has been selected (e.g., via the conversion prediction model and the conversion prediction module 250) to receive the output (i.e., pitch, promotion, or recommendation). In generating the prompt for input into the AI agent 150, the agent management module 260 may include, in the prompt, user data (e.g., information about user's preferences, information about user's purchase history, etc.), content of a current order (e.g., information about one or more items in the current order), information about one or more recipes previously converted or viewed by the user, information about expiration dates of items in the user's current inventory, one or more inputs from a third-party entity (e.g., CPG entity, brand owner, etc.) about how to promote and sell the item, some other data, or some combination thereof.

The agent management module 260 may retrieve, from the user catalog database and using an identifier of the user, the user data, the information about one or more recipes, or the information about expiration dates of items in the user's current inventory. Alternatively or additionally, the agent management module 260 may receive, via the network 130 and from the user client device 100 or a smart device associated with the user, images of items in the user's inventory with information about their expiration dates. The agent management module 260 may further receive, via the network 130 and from the user client device 100, information about the content of the current user's order. The agent management module 260 may further receive, via the network 130 and from a device associated with the third-party entity (e.g., the source computing system 120) the one or more inputs with information about how to pitch (i.e., promote and sell) the item. The third-party entity may generate the one or more inputs for the AI agent 150 of the online system 140 based on one or more features of the user, such as user's shopping preferences, user's replacement preferences, user's dietary preferences, user's brand preferences, user's price sensitivity, etc.

The online system 140 may apply the algorithmic flow in the context of replacement chat or normal shopping chat of a user of the online system 140 with the AI agent 150. The online system 140 may first gather (e.g., via the order management module 220) a set of candidate items sponsored by a third-party entity associated with the online system 140 (e.g., source, CPG entity, brand owner, etc.). The conversion prediction module 250 may run the machine-learning algorithm of the conversion prediction model to score and rank all candidate items from the set of candidate items. Then, using the scores, the conversion prediction module 250 may select an item from the set of candidate items that will be pitched to the user. The selected item may be associated with the highest score among all scores for the set of candidate items.

After that, the agent management module 260 may prompt the AI agent 150 (e.g., the generative model) to generate an optimal pitch (e.g., textual output or voice output) for the selected sponsored item and the user. The agent management module 260 may pass the pitch to the content presentation module 210, and the content presentation module 210 may use the pitch to generate a chat interface signal. The content presentation module 210 may then send, via the network 130 and to the user client device 100, the chat interface signal, wherein sending the chat interface signal causes the user client device 100 to display a chat interface with the optimal pitch in the form of textual content. Alternatively, using the chat interface signal, the user client device 100 may play the voice content of the pitch to the user. By interacting with a corresponding user interface element of the chat interface displayed at the user client device 100, the user may add the pitched item to the order.

The machine-learning training module 230 may collect user feedback data with information about the user's engagement in relation to the item pitched via the chat interface of the user client device 100. The information about the user's engagement may include information about the user converting on the pitched item, or information about the user refusing to add the pitched item to the current order. The user feedback data may be recorded at the user client device 100 and communicated, via the network 130, to the online system 140 and the machine-learning training module 230. The machine-learning training module 230 may then re-train the conversion prediction model by updating the set of parameters of the conversion prediction model using the user feedback data. Additionally, the machine-learning training module 230 (or the agent management module 260) may tune the AI agent 150 (e.g., the generative model) using the user feedback data. The conversion prediction model and the AI agent 150 may be thus reinforced based on an engagement rate of each user of the online system 140. If pitches to a given user of the online system 140 are not negatively affecting user's satisfaction, this would be considered a success, and corresponding feedback information would positively reinforce the conversion prediction model and the AI agent 150.

In one or more embodiments, a bid spent by the third-party entity on each candidate item may affect a score generated by the conversion prediction model for each candidate item. Additionally, a bid spent by the third-party entity on the selected sponsored item may affect content of the optimal pitch generated by the AI agent 150, i.e., real time communication with the user via the chat interface.

Additionally or alternatively, a bid spent by the third-party entity on the selected item may affect responses or queries that the AI agent 150 would ask the user via the chat interface when attempting to deduce their preferences. This may occur both when initially deducing the user's base preferences, but also during the application of the user's base preferences when the AI agent 150 is inferring whether these base preferences need to be supplanted. The AI agent 150 may also take into account the "type" of shopping with a goal for the AI agent 150 to reduce ad loads for online sessions that represent, e.g., quick rush orders.

In an illustrative example, the online system 140 knows that a user wants to replace blueberries with blackberries, but there are two options at a source location. In such a case, the AI agent 150 can ask the user via a chat interface of the user client device 100: "There seems to be Brand A Blackberries at the store-would that work?", where a third-party entity associated with Brand A had placed a bid for that query. And if the online system 140 identifies that the user preferred Brand B Blackberries over Brand A Blackberries, the AI agent 150 might not generate that "ad" query, but, optionally, the AI agent 150 may actually generate that "ad" query depending on how high the bid for Brand A Blackberries was. A similar approach may be devised for the list-building flow that is supported at the online system 140 through the voice-enabled AI agent 150. In such cases, the voice-enabled AI agent 150 may generate item discovery suggestions, such as "Hey we see you're building your weekly grocery shopping list but haven't selected your usual guac yet-want to try this brand? It's a unique type of guac that utilizes bananas within their recipe".

The online system 140 integrating the AI agent 150 as presented herein may provide for sponsored suggestions. The replacement suggestions and queries may be weighted in terms of responding to a specific item sponsored by a third-party entity (e.g., CPG entity, source, brand owner, etc.) if there is a reasonable difference between the sponsored item and an item that is considered optimal for a specific user. For example, if two item replacements are extremely similar (e.g., similar butters from different CPG entities), the AI agent 150 may opt to pitch the item replacement that has received a bid or has a higher bid. The agent management module 260 may also deploy the AI agent 150 for performing item replacement or item list building as a way of prompting item discovery by prompting specific queries like "This item is out of stock, but have you tried item X? It's super similar and highly rated!"

Although facilitating sponsored suggestions, the AI agent 150 may craft a right pitch for each individual user. The agent management module 260 may prompt the AI agent 150 with information about the user's ordering history, information about the user's dietary restrictions, the user's brand preferences, information about the user's price sensitivity, etc. The AI agent 150 may craft a pitch for an item around nutrition, excitement of a brand-new product, what other children are taking to school in their lunches this year, a specific coupon, etc. Additionally, the agent management module 260 may prompt the AI agent 150 to infer a suggestion of an item that is complementary with a current order, e.g., the AI agent 150 may suggest salsa when a user is ordering chips.

Figure 3:
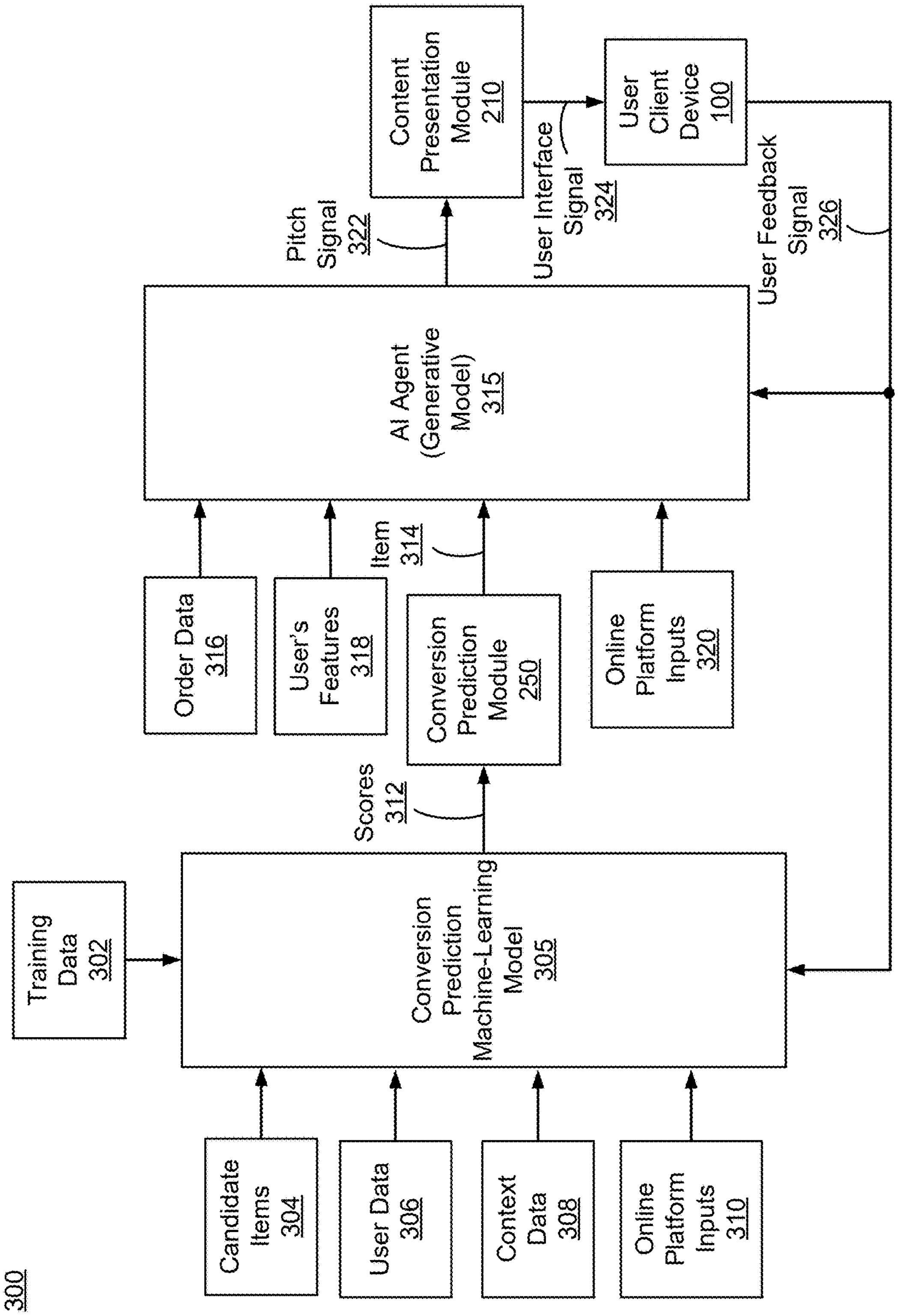
FIG. 3 illustrates an example architectural flow diagram of using an artificial intelligence (AI) agent for recommending an item to a user of an online system, in accordance with one or more embodiments.

FIG. 3 illustrates an example architectural flow diagram 300 of using an AI agent 315 for recommending an item to a user of the online system 140, in accordance with one or more embodiments. The AI agent 315 may be a generative model that is an embodiment of the AI agent 150. The process flow starts when the online system 140 receives (e.g., at the conversion prediction module 250 or some other module of the online system 140), via the network 130 and from an online platform (e.g., device associated with a third-party entity, such as CPG entity, brand owner, or source) candidate items 304. The conversion prediction module 250 may pass information about the candidate items to a conversion prediction machine-learning model 305.

Prior to running a machine-learning algorithm of the conversion prediction machine-learning model 305, the online system 140 may perform (e.g., via the machine-learning training module 230) initial training of the conversion prediction machine-learning model 305 using training data 302. The training data 302 may be generated (e.g., via the machine-learning training module 230) by retrieving, from a user catalog database (e.g., part of the data store 240), information about one or more general features for the user, each of the one or more general features related to a preference of the user that applies across multiple corresponding types of items. The machine-learning training module 230 may then generate labels for the training data 302, each label including an identifier of a missing item, an identifier of a replacement item selected by the user as a replacement for the missing item, and a set of one or more identifiers associated with the one or more general features for the user. The machine-learning training module 230 may train, using the training data 302 including the labels, the conversion prediction machine-learning model 305 to generate a set of initial values for a set of parameters of the conversion prediction machine-learning model 305.

After the training process is completed, the online system 140 may provide a set of inputs to the conversion prediction machine-learning model 305 (e.g., via the conversion prediction module 250). In addition to the information about the candidate items 304, the online system 140 may provide user data 306, context data 308, and online platform inputs 310. Some additional inputs not shown in FIG. 3 suitable for identifying a likelihood of the user's conversion of items may be further provided to the conversion prediction machine-learning model 305. In providing the information about the candidate items 304 to the conversion prediction machine-learning model 305, the conversion prediction module 250 may provide information about a taxonomy of each candidate item 304 (e.g., type or classification of each candidate item 304). The conversion prediction module 250 may retrieve, from an item catalog database (e.g., part of the data store 240) and using an identifier of each candidate item 304, the information about a taxonomy of each candidate item 304. In providing the user data 306 to the to the conversion prediction machine-learning model 305, the conversion prediction module 250 may provide information about past conversions conducted by the user (e.g., user's order history), information about the user's replacement preferences, information about the user's preferences related to types of items or brands of items, information about recipes order in the past by the user, some other user related data, or some combination thereof. The conversion prediction module 250 may retrieve, from a user catalog database (e.g., part of the data store 240) and using an identifier of the user, the user data 306.

In providing the context data 308 to the to the conversion prediction machine-learning model 305, the conversion prediction module 250 may provide information about a current timestamp (e.g., information about a current time including information about day of the week), information about a current weather, information about expiration dates of items in user's possession, some other real time data, or some combination thereof. The conversion prediction module 250 may receive at least some of the context data 308 in real time from the user client device 100 via the network 130. Additionally, the conversion prediction module 250 may retrieve a portion of the context data 308 from the user catalog database.

In providing the online platform inputs 310 to the to the conversion prediction machine-learning model 305, the conversion prediction module 250 may provide information about a bid spent on each candidate item 304 by the entity (e.g., CPG entity, source, brand owner, etc.) associated with the online platform. The conversion prediction module 250 may receive the online platform inputs 310 from the online platform (e.g., the source computing system 120) via the network 130.

The conversion prediction machine-learning model 305 may apply the machine-learning algorithm to the information about the candidate items 304, the user data 306, the context data 308, or the online platform inputs 310 to generate scores 312 for the candidate items 304. Each score 312 (e.g., value between 0 and 1) may be indicative of a likelihood of the user converting on each candidate item 304. The conversion prediction machine-learning model 305 may provide the scores 312 back to the conversion prediction module 250. The conversion prediction module 250 may select, using the scores 312, an item 314 from the candidate items 304, where the item 314 has a corresponding score 312 that is the highest among all the scores 312. The conversion prediction module 250 may pass information about the item 314 to the AI agent 315 (e.g., generative model).

The agent management module 260 (not shown in FIG. 3) may generate a prompt for input into the AI agent 315. In addition to the information about the item 314, the agent management module 260 may include order data 316, user's features 318, and/or online platform inputs 320 into the prompt for input to the AI agent 315. Some additional inputs not shown in FIG. 3 may be further provided to the AI agent 315. In providing the order data 316 to the AI agent 315, the agent management module 260 may provide information about content of a current user's order, including taxonomy information about each item in the current user's order. The agent management module 260 may receive the order data 316 from the user client device 100 via the network 130. In providing the user's features 318 to the AI agent 315, the agent management module 260 may provide information about the user's replacement preferences, information about the user's dietary preferences, information about the user's price sensitivity, information about the user's ordering history, some other user related data, or some combination thereof. The agent management module 260 may retrieve the user's features 318 from the user catalog database using the identifier of the user. In providing the online platform inputs 320 to the AI agent 315, the agent management module 260 may provide information about a bid spent on the item 314 by the entity associated with the online platform or an instruction for generating a pitch for the item 314, the instruction depending on the user's features 318. Using the information about the item 314, the order data 316, the user features 318, or the online platform inputs 320 as a prompt, the AI agent 315 may generate a pitch signal 322 with information about the pitch for the item 314. The AI agent 315 may pass the pitch signal 322 to the content presentation module 210.

The content presentation module 210 may generate, using the pitch signal 322 and the information about the item 314, a user interface signal 324. The content presentation module 210 may send, via the network 130, the user interface signal 324 to the user client device 100, wherein the sending the user interface signal 324 causes the user client device 100 to display a user interface with a description of the item 314, provide the pitch for the item 314, and display a user interface element for use by the user to add the item 314 to the current order. In one or more embodiments, the pitch signal 322 includes information about a textual pitch for the item 314. In such cases, the user interface signal 324 may cause the user client device 100 to display the user interface with the textual pitch for the item 314. In one or more other embodiments, the pitch signal 322 includes information about a voice pitch for the item 314. In such cases, the user interface signal 324 may cause the user client device 100 to play the voice pitch for the item 314.

Based on a user's engagement with the item 314 that was recommended (i.e., pitched) to the user, the user client device 100 may generate and record a user feedback signal 326. The user feedback signal 326 may be indicative of the user's acceptance and conversion of the pitched item 314. Alternatively, the user feedback signal 326 may be indicative of the user's refusal to add the pitched item 314 to the current order.

The online system 140 may receive (e.g., at the machine-learning training module 230 or the agent management module 260) the user feedback signal 326 from the user client device 100 via the network 130. The machine-learning training module 230 may utilize the user feedback signal 326 to re-train the conversion prediction machine-learning model 305. By utilizing user feedback signals 326 provided by various users of the online system 140, the machine-learning training module 230 may update the set of parameters of the conversion prediction machine-learning model 305 and continuously improve the machine-learning algorithm of the conversion prediction machine-learning model 305. Additionally, the agent management module 260 (or the machine-learning training module 230) may utilize the user feedback signal 326 to tune the AI agent 315. By utilizing user feedback signals 326 provided by various users of the online system 140, the agent management module 260 (or the machine-learning training module 230) may update a set of parameters of the AI agent 315 and continuously improve the inference of the AI agent 315.

Figure 4:
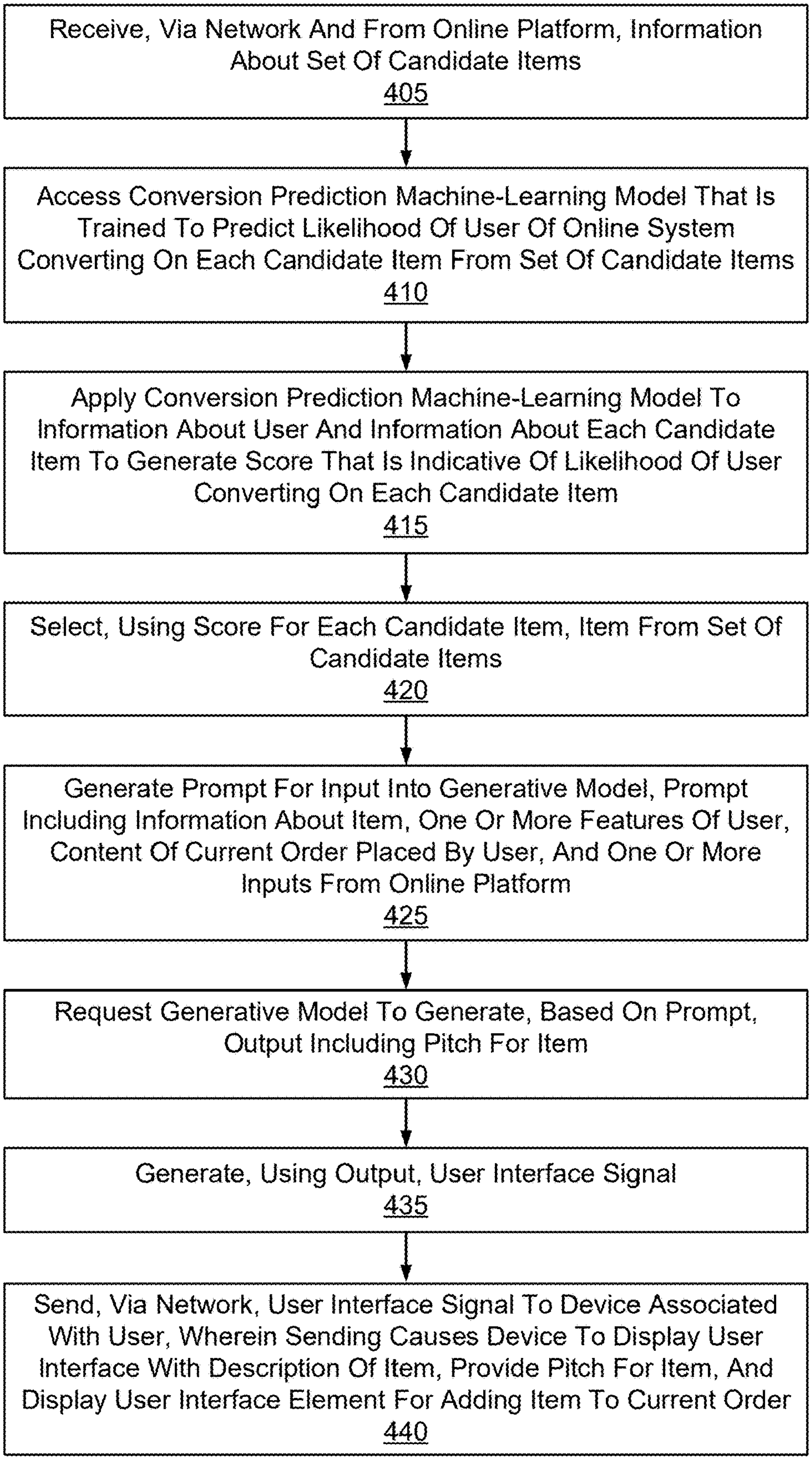
FIG. 4 is a flowchart for a method of using an AI agent for recommending an item to a user of an online system, in accordance with one or more embodiments, in accordance with one or more embodiments.

FIG. 4 is a flowchart for a method of using an AI agent (e.g., generative model, such as the AI agent 150, the AI agent 315, or the like) for recommending an item to a user of an online system, in accordance with one or more embodiments. Alternative embodiments may include more, fewer, or different steps from those illustrated in FIG. 4, and the steps may be performed in a different order from that illustrated in FIG. 4. These steps may be performed by an online system (e.g., the online system 140). Additionally, each of these steps may be performed automatically by the online system without human intervention.

The online system 140 receives 405 (e.g., at the conversion prediction module 250), via a network (e.g., the network 130) and from an online platform (e.g., a device associated with a third-party entity), information about a set of candidate items. The online system 140 accesses 410 a conversion prediction machine-learning model of the online system 140 (e.g., via the conversion prediction module 250), wherein the conversion prediction machine-learning model is trained to predict a likelihood of a user of the online system 140 converting on each candidate item from the set of candidate items. The online system 140 applies 415 the conversion prediction machine-learning model (e.g., via the conversion prediction module 250) to information about the user and information about each candidate item from the set of candidate items to generate a score that is indicative of the likelihood of the user converting on each candidate item from the set of candidate items. The online system 140 selects 420 (e.g., via the conversion prediction module 250), using the score for each candidate item, an item from the set of candidate items.

The online system 140 may retrieve (e.g., via the conversion prediction module 250), from a database of the online system 140 (e.g., the data store 240) and using an identifier of the user, the information about the user including information about past conversions conducted by the user, and information about one or more features for the user, each of the one or more features related to a preference of the user for a type of items. The online system 140 may retrieve (e.g., via the conversion prediction module 250), from the database and using an identifier of each candidate item from the set of candidate items, the information about each candidate item including information about a type of each candidate item.

The online system 140 may receive (e.g., at the conversion prediction module 250), via the network and from the online platform, information about a bid spent on each candidate item from the set of candidate items by an entity associated with the online platform (e.g., CPG entity, source, brand owner, etc.). The online system 140 may apply the conversion prediction machine-learning model (e.g., via the conversion prediction module 250) further to the information about the bid to generate the score for each candidate item from the set of candidate items.

The online system 140 generates 425 (e.g., via the agent management module 260) a prompt for input into a generative model (or AI agent), the prompt including information about the item, one or more features of the user, content of a current order placed by user, and one or more inputs from the online platform. The online system 140 requests 430 (e.g., via the agent management module 260) the generative model to generate, based on the prompt input into the generative model, an output including a pitch for the item.

The online system 140 may receive (e.g., at the agent management module 260), via the network and from the online platform, the one or more inputs including information about a bid spent on the item by an entity associated with the online platform (e.g., CPG entity, source, brand owner, etc.). The online system 140 may generate the prompt by including (e.g., via the agent management module 260) the information about the bid into the prompt.

The online system 140 may receive (e.g., at the agent management module 260), via the network and from the online platform, the one or more inputs including an instruction for generating the pitch for the item, the instruction depending on one or more features of the user. The online system 140 may generate the prompt by including (e.g., via the agent management module 260) the instruction for generating the pitch for the item into the prompt.

The online system 140 generates 435 (e.g., via the content presentation module 210), using the output, a user interface signal. The online system 140 sends 440 (e.g., via the content presentation module 210), via the network, the user interface signal to a device associated with the user (e.g., the user client device 100), wherein the sending the user interface signal causes the device associated with the user to display a user interface with a description of the item, provide the pitch for the item, and display a user interface element for use by the user to add the item to the current order.

In one or more embodiments, the output of the generative model includes a textual pitch for the item. In such cases, the online system 140 may send (e.g., via the content presentation module 210) the user interface signal to the device associated with the user, wherein the sending the user interface signal may cause the device associated with the user to display the user interface with the textual pitch for the item. In one or more other embodiments, the output of the generative model may include a voice pitch for the item. In such cases, the online system 140 may send (e.g., via the content presentation module 210) the user interface signal to the device associated with the user, wherein the sending the user interface signal may cause the device associated with the user to play the voice pitch for the item.

The online system 140 may further receive (e.g., at the conversion prediction module 250), via the network and from the online platform, information about a second item (e.g., promotional item). The online system 140 may then apply the conversion prediction machine-learning model (e.g., via the conversion prediction module 250) to information about each candidate user from a set of candidate users of the online system 140 and information about the second item to generate a conversion score that is indicative of a likelihood of each candidate user from the set of candidate users converting on the second item. The online system 140 may select (e.g., via the conversion prediction module 250), using the score for each candidate user, a preferred user from the set of candidate users.

The online system 140 may generate (e.g., via the agent management module 260) a second prompt for input into the generative model, the second prompt including one or more features of the preferred user and one or more inputs from the online platform. The online system 140 may request (e.g., via the agent management module 260) the generative model to generate, based on the second prompt input into the generative model, a second output including a second pitch for the second item. The online system 140 may generate (e.g., via the content presentation module 210), using the second output, a second user interface signal. The online system 140 may send (e.g., via the content presentation module 210), via the network, the second user interface signal to a device associated with the preferred user (e.g., the user client device 100), wherein the sending the second user interface signal causes the device associated with the preferred user to display a user interface with a description of the second item, provide the second pitch for the item, and display a second user interface element for use by the preferred user to add the second item to a current order of the preferred user.

The online system 140 may retrieve (e.g., via the machine-learning training module 230), from a database of the online system 140 (e.g., the data store 240), information about one or more general features for the user, each of the one or more general features related to a preference of the user that applies across multiple corresponding types of items. The online system 140 may generate (e.g., via the machine-learning training module 230) a plurality of labels, each of the plurality of labels including an identifier of a missing item, an identifier of a replacement item selected by the user as a replacement for the missing item, and a set of one or more identifiers associated with the one or more general features for the user. The online system 140 may train (e.g., via the machine-learning training module 230), using training data including the plurality of labels, the conversion prediction machine-learning model to generate a set of initial values for a set of parameters of the conversion prediction machine-learning model.

The online system 140 may receive (e.g., at the machine-learning training module 230 and the agent management module 260), via the network and from the device associated with the user, a user feedback signal including information about an engagement by the user with the item in response to the pitch. The online system 140 may re-train the conversion prediction machine-learning model by updating (e.g., via the machine-learning training module 230, using the user feedback signal, a set of parameters of the conversion prediction machine-learning model. The online system 140 may also tune (e.g., via the agent management module 260) the generative model using the user feedback signal.

Embodiments of the present disclosure are directed to the online system 140 that deploys an AI agent (e.g., generative model) supported by a trained engagement prediction machine-learning model to allow for personalized communication with users of the online system 140, such as personalized recommendation and promotion of items for inclusion into online orders. The engagement prediction machine-learning model may select an item for promotion in a chat interface of the user client device 100 associated with a user of the online system 140. The AI agent may then generate an output for the chat interface (e.g., textual output or voice output) that provides a pitch for the promoted item, thus enabling the user to build an online order with the promoted item.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:
- receiving, via a network and from an online platform, information about a set of candidate items;
- accessing a conversion prediction model of the computer system, wherein the conversion prediction model is a machine-learning model trained to predict a likelihood of a user of the computer system converting on each candidate item from the set of candidate items;
- receiving, at an agent management module and via the network, images of a set of items from a device associated with the user in real time;
- identifying, by the agent management module and using the images of the set of items, information about expiration dates of the set of items;
- retrieving, from a database of the computer system and using an identifier of the user, information about the user including information about past conversions conducted by the user and information about one or more features for the user, each of the one or more features related to a preference of the user for a type of items;
- retrieving, from the database and using an identifier of each candidate item from the set of candidate items, information about each candidate item including information about a type of each candidate item;
- applying the conversion prediction model to the information about the user, the information about expiration dates of the set of items, and the information about each candidate item from the set of candidate items to generate a score that is indicative of the likelihood of the user converting on each candidate item from the set of candidate items;
- selecting, using the score for each candidate item, an item from the set of candidate items;
- generating a prompt for input into a generative model of the computer system, the prompt including information about the item, one or more features of the user including the information about expiration dates of the set of items, content of a current order placed by the user, and one or more inputs from the online platform;
- requesting the generative model to generate, based on the prompt input into the generative model, an output including a pitch for the item;
- generating, using the output, a user interface signal; and
- sending, via the network, the user interface signal to a device associated with the user, wherein sending the user interface signal causes the device associated with the user to display a user interface with a description of the item, provide the pitch for the item, and display a user interface element for use by the user to add the item to the current order.

2. The method of claim 1, further comprising:
- receiving, via the network and from the online platform, information about a second item;
- applying the conversion prediction model to information about each candidate user from a set of candidate users of the computer system and information about the second item to generate a conversion score that is indicative of a likelihood of each candidate user from the set of candidate users converting on the second item;

selecting, using the score for each candidate user, a preferred user from the set of candidate users;

generating a second prompt for input into the generative model, the second prompt including one or more features of the preferred user and one or more inputs from the online platform;

requesting the generative model to generate, based on the second prompt input into the generative model, a second output including a second pitch for the second item;

generating, using the second output, a second user interface signal; and sending, via the network, the second user interface signal to a device associated with the preferred user, wherein sending the second user interface signal causes the device associated with the preferred user to display a user interface with a description of the second item, provide the second pitch for the item, and display a second user interface element for use by the preferred user to add the second item to a current order of the preferred user.

3. The method of claim 1, wherein applying the conversion prediction model comprises:

receiving, via the network and from the online platform, information about a bid spent on each candidate item from the set of candidate items by an entity associated with the online platform; and applying the conversion prediction model further to the information about the bid to generate the score for each candidate item from the set of candidate items.

4. The method of claim 1, wherein generating the prompt comprises:

receiving, via the network and from the online platform, the one or more inputs including information about a bid spent on the item by an entity associated with the online platform; and generating the prompt by including the information about the bid into the prompt.

5. The method of claim 1, wherein generating the prompt comprises:

receiving, via the network and from the online platform, the one or more inputs including an instruction for generating the pitch for the item, the instruction depending on one or more features of the user; and generating the prompt by including the instruction for generating the pitch for the item into the prompt.

6. The method of claim 1, wherein:

the output of the generative model includes a textual pitch for the item; and sending the user interface signal causes the device associated with the user to display the user interface with the textual pitch for the item.

7. The method of claim 1, wherein:

the output of the generative model includes a voice pitch for the item; and sending the user interface signal causes the device associated with the user to play the voice pitch for the item.

8. The method of claim 1, further comprising:

retrieving, from the database, information about one or more general features for the user, each of the one or more general features related to a preference of the user that applies across multiple corresponding types of items;

generating a plurality of labels, each of the plurality of labels including an identifier of a missing item, an identifier of a replacement item selected by the user as a replacement for the missing item, and a set of one or more identifiers associated with the one or more general features for the user; and training, using training data including the plurality of labels, the conversion prediction model to generate a set of initial values for a set of parameters of the conversion prediction model.

9. The method of claim 1, further comprising:

receiving, via the network and from the device associated with the user, a user feedback signal including information about an engagement by the user with the item in response to the pitch; and re-training the conversion prediction model by updating, using the user feedback signal, a set of parameters of the conversion prediction model.

10. The method of claim 1, further comprising:

receiving, via the network and from the device associated with the user, a user feedback signal including information about an engagement by the user with the item in response to the pitch; and tuning the generative model using the user feedback signal.

11. A computer program product comprising a non-transitory computer readable storage medium having instructions encoded thereon that, when executed by a processor, cause the processor to perform steps comprising:

receiving, via a network and from an online platform, information about a set of candidate items;

accessing a conversion prediction model of a computer system, wherein the conversion prediction model is a machine-learning model trained to predict a likelihood of a user of the computer system converting on each candidate item from the set of candidate items;

receiving, at an agent management module and via the network, images of a set of items from a device associated with the user in real time;

identifying, by the agent management module and using the images of the set of items, information about expiration dates of the set of items;

retrieving, from a database of the computer system and using an identifier of the user, information about the user including information about past conversions conducted by the user and information about one or more features for the user, each of the one or more features related to a preference of the user for a type of items;

retrieving, from the database and using an identifier of each candidate item from the set of candidate items, information about each candidate item including information about a type of each candidate item;

applying the conversion prediction model to the information about the user, the information about expiration dates of the set of items, and the information about each candidate item from the set of candidate items to generate a score that is indicative of the likelihood of the user converting on each candidate item from the set of candidate items;

selecting, using the score for each candidate item, an item from the set of candidate items;

generating a prompt for input into a generative model of the computer system, the prompt including information about the item, one or more features of the user including the information about expiration dates of the set of items, content of a current order placed by the user, and one or more inputs from the online platform;

requesting the generative model to generate, based on the prompt input into the generative model, an output including a pitch for the item;

generating, using the output, a user interface signal; and sending, via the network, the user interface signal to a device associated with the user, wherein sending the user interface signal causes the device associated with the user to display a user interface with a description of the item, provide the pitch for the item, and display a user interface element for use by the user to add the item to the current order.

12. The computer program product of claim 11, wherein the instructions further cause the processor to perform steps comprising:

receiving, via the network and from the online platform, information about a second item;

applying the conversion prediction model to information about each candidate user from a set of candidate users of the computer system and information about the second item to generate a conversion score that is indicative of a likelihood of each candidate user from the set of candidate users converting on the second item;

selecting, using the score for each candidate user, a preferred user from the set of candidate users;

generating a second prompt for input into the generative model, the second prompt including one or more features of the preferred user and one or more inputs from the online platform;

requesting the generative model to generate, based on the second prompt input into the generative model, a second output including a second pitch for the second item;

generating, using the second output, a second user interface signal; and sending, via the network, the second user interface signal to a device associated with the preferred user, wherein sending the second user interface signal causes the device associated with the preferred user to display a user interface with a description of the second item, provide the second pitch for the item, and display a second user interface element for use by the preferred user to add the second item to a current order of the preferred user.

13. The computer program product of claim 11, wherein the instructions further cause the processor to perform steps comprising:

receiving, via the network and from the online platform, information about a bid spent on each candidate item from the set of candidate items by an entity associated with the online platform; and applying the conversion prediction model further to the information about the bid to generate the score for each candidate item from the set of candidate items.

14. The computer program product of claim 11, wherein the instructions further cause the processor to perform steps comprising:

receiving, via the network and from the online platform, the one or more inputs including information about a bid spent on the item by an entity associated with the online platform; and generating the prompt by including the information about the bid into the prompt.

15. The computer program product of claim 11, wherein the instructions further cause the processor to perform steps comprising:

receiving, via the network and from the online platform, the one or more inputs including an instruction for generating the pitch for the item, the instruction depending on one or more features of the user; and generating the prompt by including the instruction for generating the pitch for the item into the prompt.

16. The computer program product of claim 11, wherein the instructions further cause the processor to perform steps comprising:

requesting the generative model to generate the output including a textual pitch for the item; and sending the user interface signal to cause the device associated with the user to display the user interface with the textual pitch for the item.

17. The computer program product of claim 11, wherein the instructions further cause the processor to perform steps comprising:

requesting the generative model to generate the output including a voice pitch for the item; and sending the user interface signal to cause the device associated with the user to play the voice pitch for the item.

18. The computer program product of claim 11, wherein the instructions further cause the processor to perform steps comprising:

receiving, via the network and from the device associated with the user, a user feedback signal including information about an engagement by the user with the item in response to the pitch;

re-training the conversion prediction model by updating, using the user feedback signal, a set of parameters of the conversion prediction model; and tuning the generative model using the user feedback signal.

19. A computer system comprising:

a processor; and a non-transitory computer-readable storage medium having instructions that, when executed by the processor, cause the computer system to perform steps comprising:

receiving, via a network and from an online platform, information about a set of candidate items;

accessing a conversion prediction model of the computer system, wherein the conversion prediction model is a machine-learning model trained to predict a likelihood of a user of the computer system converting on each candidate item from the set of candidate items;

receiving, at an agent management module and via the network, images of a set of items from a device associated with the user in real time;

identifying, by the agent management module and using the images of the set of items, information about expiration dates of the set of items;

retrieving, from a database of the computer system and using an identifier of the user, information about the user including information about past conversions conducted by the user and information about one or more features for the user, each of the one or more features related to a preference of the user for a type of items;

retrieving, from the database and using an identifier of each candidate item from the set of candidate items, information about each candidate item including information about a type of each candidate item:

applying the conversion prediction model to the information about the user, the information about expiration dates of the set of items, and the information about each candidate item from the set of candidate items to generate a score that is indicative of the likelihood of the user converting on each candidate item from the set of candidate items;

selecting, using the score for each candidate item, an item from the set of candidate items;

generating a prompt for input into a generative model of the computer system, the prompt including information about the item, one or more features of the user including the information about expiration dates of the set of items, content of a current order placed by the user, and one or more inputs from the online platform;

requesting the generative model to generate, based on the prompt input into the generative model, an output including a pitch for the item;

generating, using the output, a user interface signal; and sending, via the network, the user interface signal to a device associated with the user, wherein sending the user interface signal causes the device associated with the user to display a user interface with a description of the item, provide the pitch for the item, and display a user interface element for use by the user to add the item to the current order.

* * * * *